US012591528B2

(12) United States Patent
Woo et al.

(10) Patent No.: US 12,591,528 B2
(45) Date of Patent: Mar. 31, 2026

(54) QUAD-CHANNEL MEMORY MODULE

(71) Applicant: Rambus Inc., San Jose, CA (US)

(72) Inventors: Steven C. Woo, Saratoga, CA (US);
Dongyun Lee, Sunnyvale, CA (US)

(73) Assignee: Rambus Inc., San Jose, CA (US)

( * ) Notice: Subject to any disclaimer, the term of this patent is extended or adjusted under 35 U.S.C. 154(b) by 181 days.

(21) Appl. No.: 18/569,451

(22) PCT Filed: Jun. 20, 2022

(86) PCT No.: PCT/US2022/034142
§ 371 (c)(1),
(2) Date: Dec. 12, 2023

(87) PCT Pub. No.: WO2022/271581
PCT Pub. Date: Dec. 29, 2022

(65) Prior Publication Data
US 2024/0211420 A1        Jun. 27, 2024

Related U.S. Application Data

(60) Provisional application No. 63/246,664, filed on Sep. 21, 2021, provisional application No. 63/213,337, filed on Jun. 22, 2021.

(51) Int. Cl.
*G06F 13/16*        (2006.01)

(52) U.S. Cl.
CPC ...... *G06F 13/1673* (2013.01); *G06F 13/1689* (2013.01)

(58) Field of Classification Search
CPC ............. G06F 13/1673; G06F 13/1689; G06F 13/1684; G11C 5/04; G11C 7/10; G11C 11/4093
USPC ........................................ 365/189.05, 230.06
See application file for complete search history.

(56) References Cited

U.S. PATENT DOCUMENTS 6,330,665 B1 * 12/2001 Wise ................... G06F 12/0207
                                                          711/E12.003
7,356,639 B2      4/2008 Perego et al.
(Continued)

FOREIGN PATENT DOCUMENTS

| JP | WO2004001762 A1 * | 10/2005 | ....... G11C 11/40603 |
| WO | 2020-117481 A1 | 6/2020 | |
| WO | WO-2020-176291 A1 | 9/2020 | |

OTHER PUBLICATIONS

EP Extended European Search Report with Mail Date Apr. 1, 2025 re: EP Appln. No. 22829075.5. 10 pages.
(Continued)

*Primary Examiner* — Michael T Tran
(74) *Attorney, Agent, or Firm* — The Neudeck Law Firm, LLC

(57) ABSTRACT

A four-channel memory module includes four independent memory channels and dual channel memory devices. The channels of the dual channel memory are accessed independently. Thus, the four channels for accessing the memory module each access one channel of a first set and a second set of dual channel memory devices on the module. Dual channel data buffer devices are also included on the module. The dual channel data buffer devices also retime data strobe signals for accesses to/from the sets of dual channel memory devices.

20 Claims, 12 Drawing Sheets

TRANSMITTING, BY A FIRST DRAM DEVICE AND TO A DATA BUFFER DEVICE, FIRST DATA AND A FIRST TIMING STROBE
802

TRANSMITTING, BY A SECOND DRAM DEVICE AND TO THE DATA BUFFER DEVICE, SECOND DATA AND A SECOND TIMING STROBE
804

TRANSMITTING, BY THE DATA BUFFER DEVICE AND TO A CONTROLLER, THE FIRST DATA, THE SECOND DATA, AND A THIRD TIMING STROBE THAT IS BASED ON THE SECOND TIMING STROBE
806

(56)        References Cited

U.S. PATENT DOCUMENTS

| | | | |
|---|---|---|---|
| 7,508,723 B2 | 3/2009 | Goodwin et al. | |
| 7,711,887 B1 | 5/2010 | Wames et al. | |
| 8,275,936 B1 | 9/2012 | Haywood et al. | |
| 9,653,146 B2 | 5/2017 | Ware et al. | |
| 9,792,965 B2 * | 10/2017 | Best | G11C 7/1093 |
| 10,146,711 B2 | 12/2018 | Nale et al. | |
| 10,628,343 B2 | 4/2020 | Lee | |
| 10,866,916 B2 | 12/2020 | Amirkhany et al. | |
| 2006/0095592 A1 * | 5/2006 | Borkenhagen | G06F 13/1684 |
| | | | 710/2 |
| 2009/0327596 A1 | 12/2009 | Christenson et al. | |
| 2010/0005218 A1 | 1/2010 | Gower et al. | |
| 2014/0325105 A1 | 10/2014 | Prete et al. | |
| 2014/0334238 A1 | 11/2014 | Ware et al. | |
| 2019/0033952 A1 * | 1/2019 | Mcilvain | G06F 1/3203 |
| 2020/0075079 A1 | 3/2020 | Kim et al. | |
| 2020/0265876 A1 | 8/2020 | Takefman et al. | |
| 2021/0216401 A1 * | 7/2021 | Meaney | G06F 9/30047 |
| 2022/0413752 A1 * | 12/2022 | Zhang | G06F 12/0875 |
| 2024/0272982 A1 * | 8/2024 | Woo | G06F 11/1068 |

OTHER PUBLICATIONS

Notification of Transmittal of the International Search Report and the Written Opinion of the International Searching Authority, or the Declaration with Mail Date Sep. 28, 2022 re: Int'l Appln. No. PCT/US2022/034142. 12 pages.

* cited by examiner

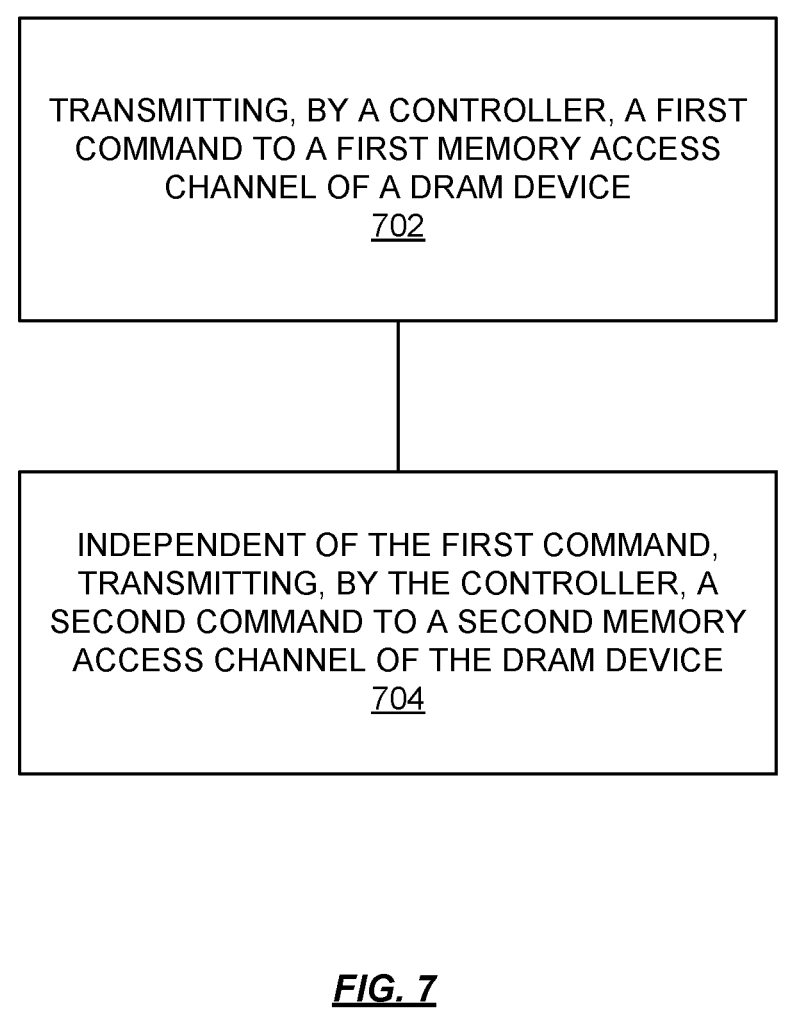

TRANSMITTING, BY A CONTROLLER, A FIRST
COMMAND TO A FIRST MEMORY ACCESS
CHANNEL OF A DRAM DEVICE
702

INDEPENDENT OF THE FIRST COMMAND,
TRANSMITTING, BY THE CONTROLLER, A
SECOND COMMAND TO A SECOND MEMORY
ACCESS CHANNEL OF THE DRAM DEVICE
704

*FIG. 7*

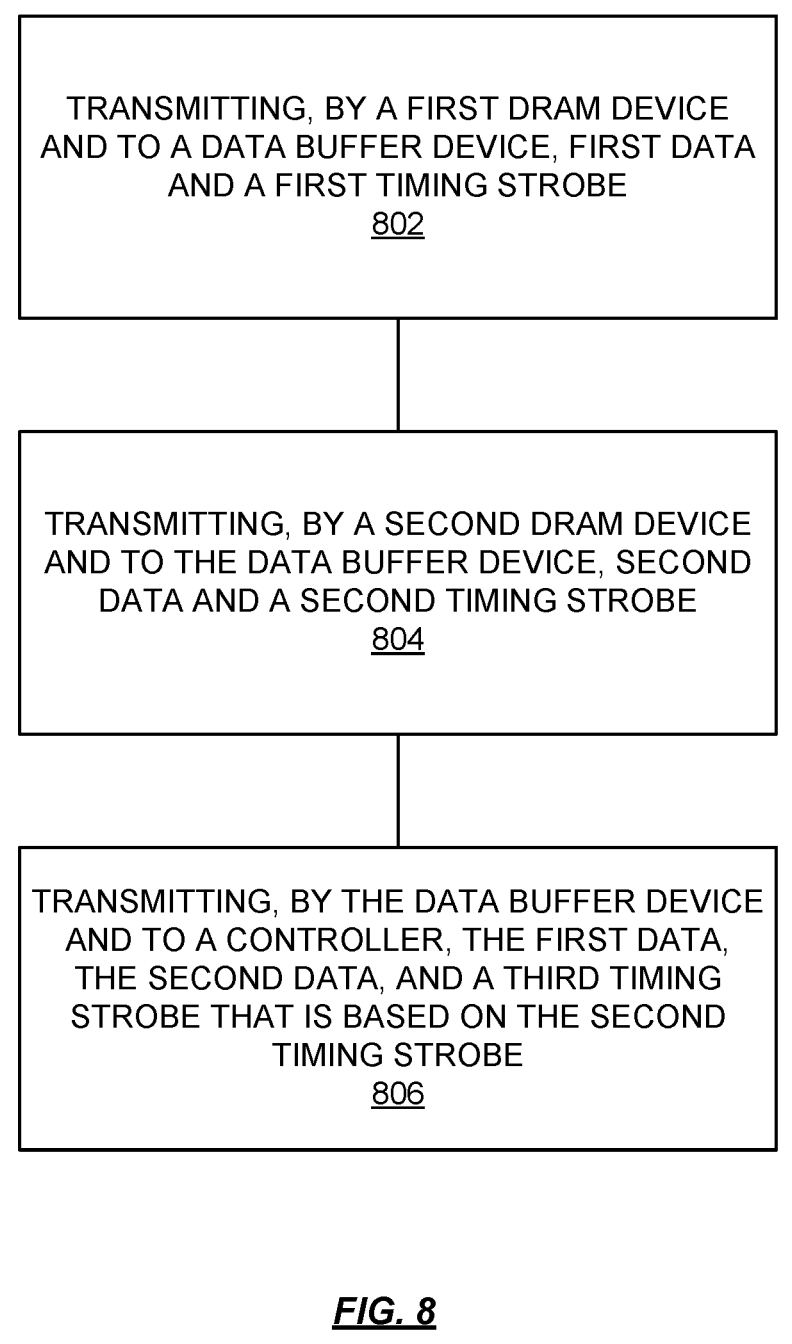

TRANSMITTING, BY A FIRST DRAM DEVICE
AND TO A DATA BUFFER DEVICE, FIRST DATA
AND A FIRST TIMING STROBE
802

TRANSMITTING, BY A SECOND DRAM DEVICE
AND TO THE DATA BUFFER DEVICE, SECOND
DATA AND A SECOND TIMING STROBE
804

TRANSMITTING, BY THE DATA BUFFER DEVICE
AND TO A CONTROLLER, THE FIRST DATA,
THE SECOND DATA, AND A THIRD TIMING
STROBE THAT IS BASED ON THE SECOND
TIMING STROBE
806

*FIG. 8*

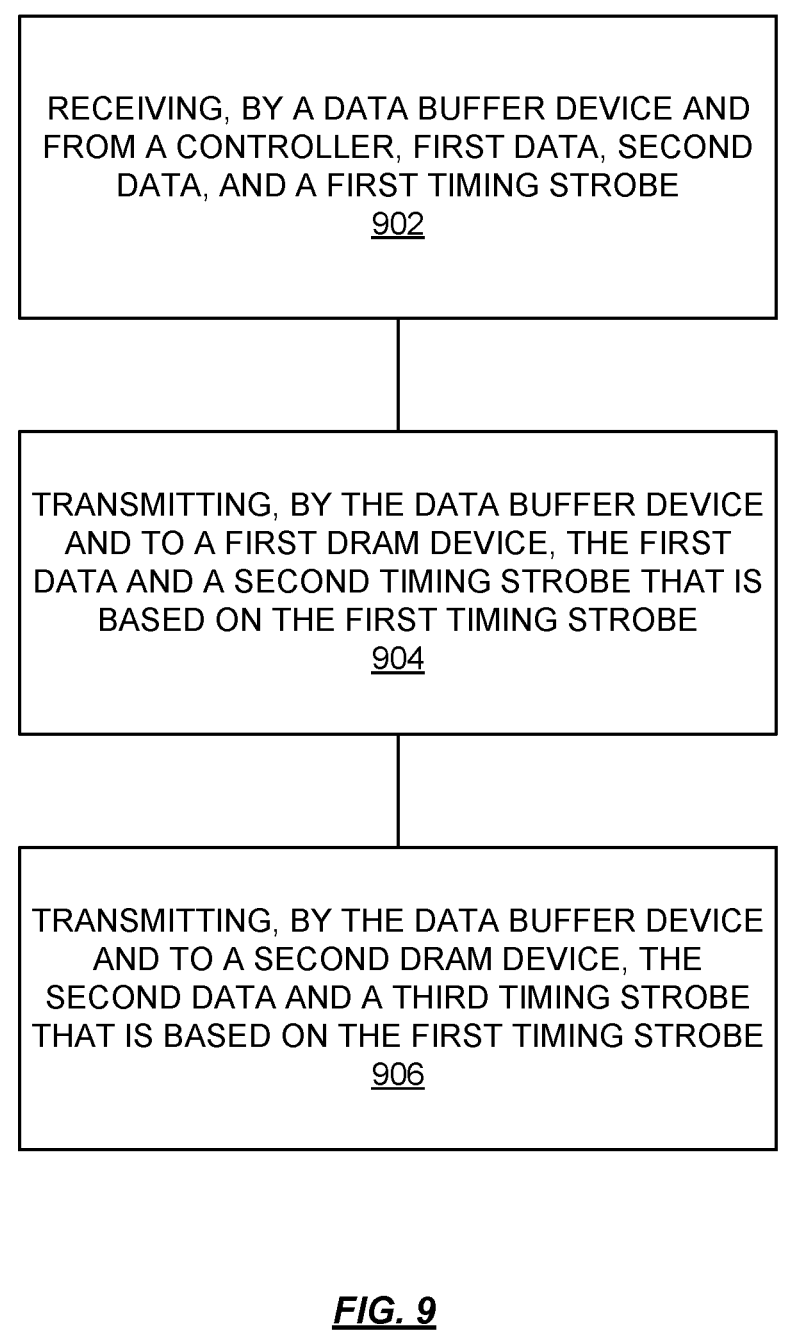

RECEIVING, BY A DATA BUFFER DEVICE AND FROM A CONTROLLER, FIRST DATA, SECOND DATA, AND A FIRST TIMING STROBE
902

TRANSMITTING, BY THE DATA BUFFER DEVICE AND TO A FIRST DRAM DEVICE, THE FIRST DATA AND A SECOND TIMING STROBE THAT IS BASED ON THE FIRST TIMING STROBE
904

TRANSMITTING, BY THE DATA BUFFER DEVICE AND TO A SECOND DRAM DEVICE, THE SECOND DATA AND A THIRD TIMING STROBE THAT IS BASED ON THE FIRST TIMING STROBE
906

*FIG. 9*

QUAD-CHANNEL MEMORY MODULE

BRIEF DESCRIPTION OF THE DRAWINGS

FIG. 7 is a flowchart illustrating a method of accessing a dual channel memory device.

FIG. 8 is a flowchart illustrating a method of providing a data strobe to a controller.

FIG. 9 is a flowchart illustrating a method of providing data strobes to memory devices.

DETAILED DESCRIPTION OF THE EMBODIMENTS

A four-channel memory module includes four independent memory channels and dual channel memory devices. The channels of the dual channel memory are accessed independently. Thus, the four channels for accessing the memory module each access one channel of a first set and a second set of dual channel memory devices on the module. Dual channel data buffer devices are also included on the module. The dual channel data buffer devices also retime data strobe signals for accesses to/from the sets of dual channel memory devices.

Figure 1:
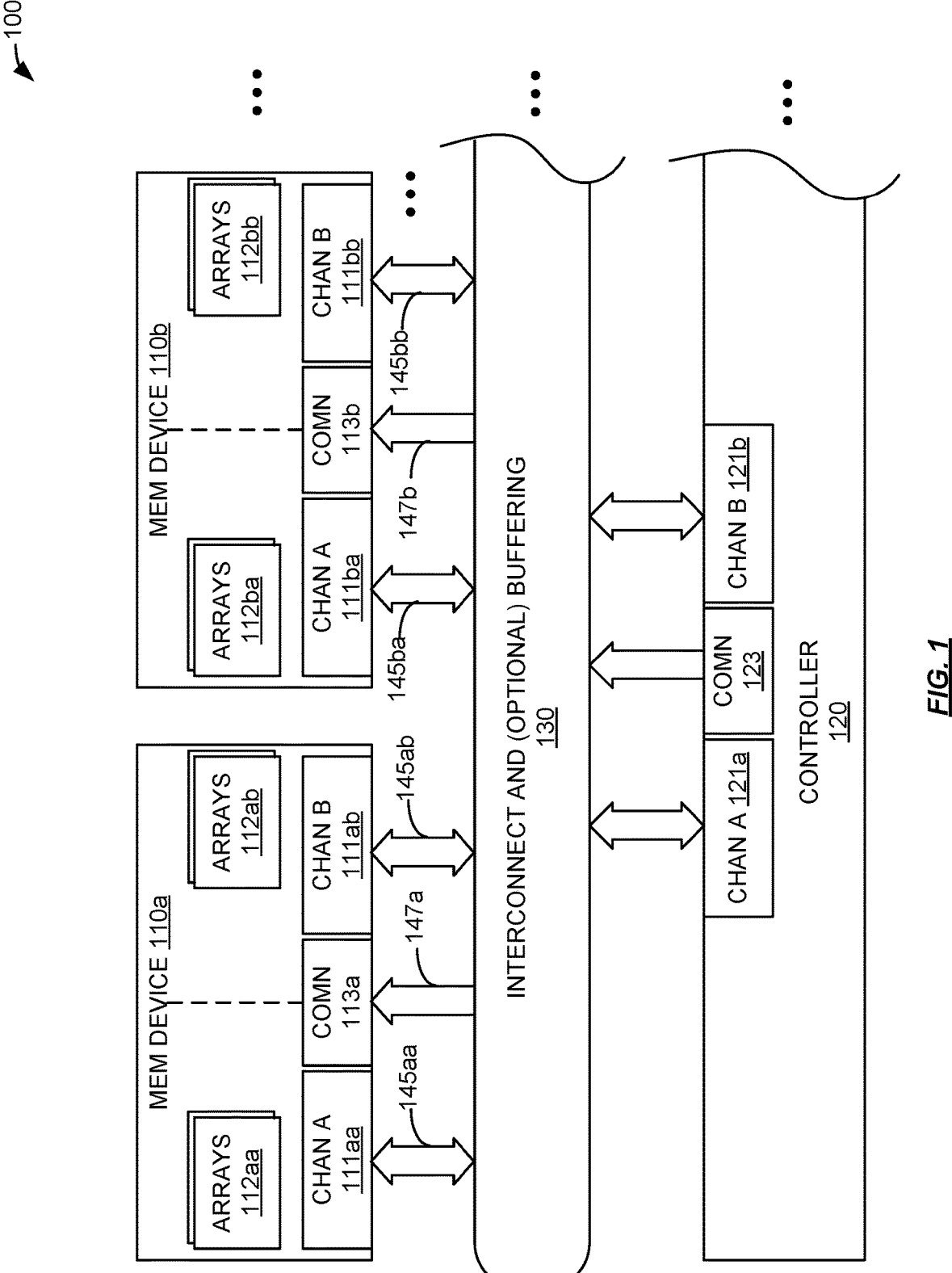
FIG. 1 is a block diagram illustrating a memory system.

FIG. 1 is a block diagram illustrating a memory system. In FIG. 1 memory system 100 comprises memory devices 110a-110b, controller 120, and interconnect 130. Interconnect 130 may optionally include buffering. Memory devices 110a-110b respectively include channel A interface 111aa-111ba, channel B interface 111ab-111bb, and common signal interface 113a-113b. Memory device 110a also includes memory arrays 112aa-112ab. Memory device 110b includes memory arrays 112ba-112bb. Controller 120 includes channel A interface 121a, channel B interface 121b, and common signal interface 123. In an embodiment, memory devices 110a-110b are disposed on a substrate having local interfaces (not shown in FIG. 1), local interconnects 145aa-145bb, and 147a-147b thereby forming a memory module.

Controller 120 is operatively coupled to channel A interface 111aa of memory device 110a via channel A interface 121a, interconnect 130, and local interconnect 145aa. Controller 120 is operatively coupled to channel B interface 111ab of memory device 110a via channel B interface 121b, interconnect 130, and local interconnect 145ab. Controller 120 is operatively coupled to common signal interface (e.g., clock signal, chip select) 113a of memory device 110a via common signal interface 123, interconnect 130, and local interconnect 147a.

Controller 120 is operatively coupled to channel A interface 111ba of memory device 110b via channel A interface 121a, interconnect 130, and local interconnect 145ba. Controller 120 is operatively coupled to channel B interface 111bb of memory device 110b via channel B interface 121b, interconnect 130, and local interconnect 145bb. Controller 120 is operatively coupled to common signal interface 113b of memory device 110b via common signal interface 123, interconnect 130, and local interconnect 147b.

Each of channels A-B of memory devices 110a-110b operate command, address, and data transfer functions of their respective channels A-B and channel interfaces 111aa-111bb independently of the other channel A-B and channel interfaces 111aa-111bb. Each of channels A-B access non-overlapping sets of memory arrays 112aa-112bb in their respective memory device 110a-110b. In an embodiment, each of channel interfaces 111aa-111bb and 121a-121b include two (2) bidirectional data (DQ) signals and at least one data strobe (DQS) signal. Each of the channel interfaces 111aa-111bb 121a-121b include a command address (CA) bus interface that operates independently of the other CA bus interfaces to access non-overlapping sets of memory arrays 112aa-112bb in their respective memory device 110a-110b.

In an embodiment, memory device 110a-110b are representative of a larger number of memory devices 110a-110b on a memory module. For example, memory devices 110a-110b may be representative of ten (10) memory devices 110a-110b on a memory module. In this example, therefore, channel interfaces 121a-121b of controller 120 form two (A and B) twenty (20) data bit channels (along with accompanying CA signals). Each twenty data bit channel may communicate sixteen (16) data bits along with four (4) bits of reliability, availability, serviceability (RAS) information (e.g., Reed-Solomon—RS—coding or error correct and detect EDC coding).

Controller 120 may also include additional channels coupled to additional memory devices 110a-110b on the same module. For example, controller 120 may include two additional channel interfaces (e.g., channel C and channel D interfaces) that couple to another ten (10) memory devices thereby forming an additional two (C and D) twenty (20) data bit channels (along with accompanying CA signals). Similar to channels A-B, each additional twenty data bit channel may communicate sixteen (16) data bits along with four (4) bits of RAS information.

Figure 2A:
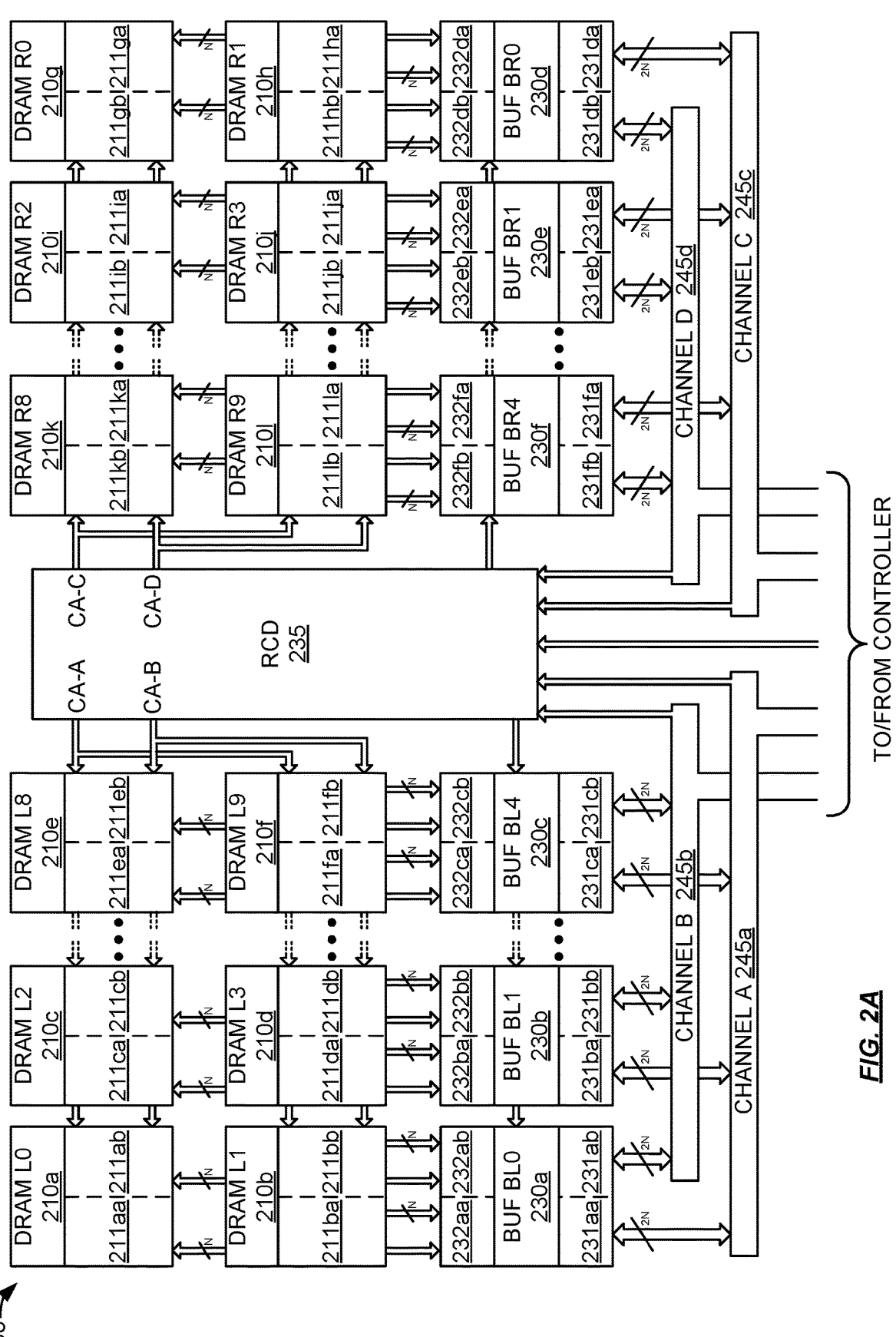
FIGS. 2A-2C illustrate a buffered memory module.
Figure 2B:
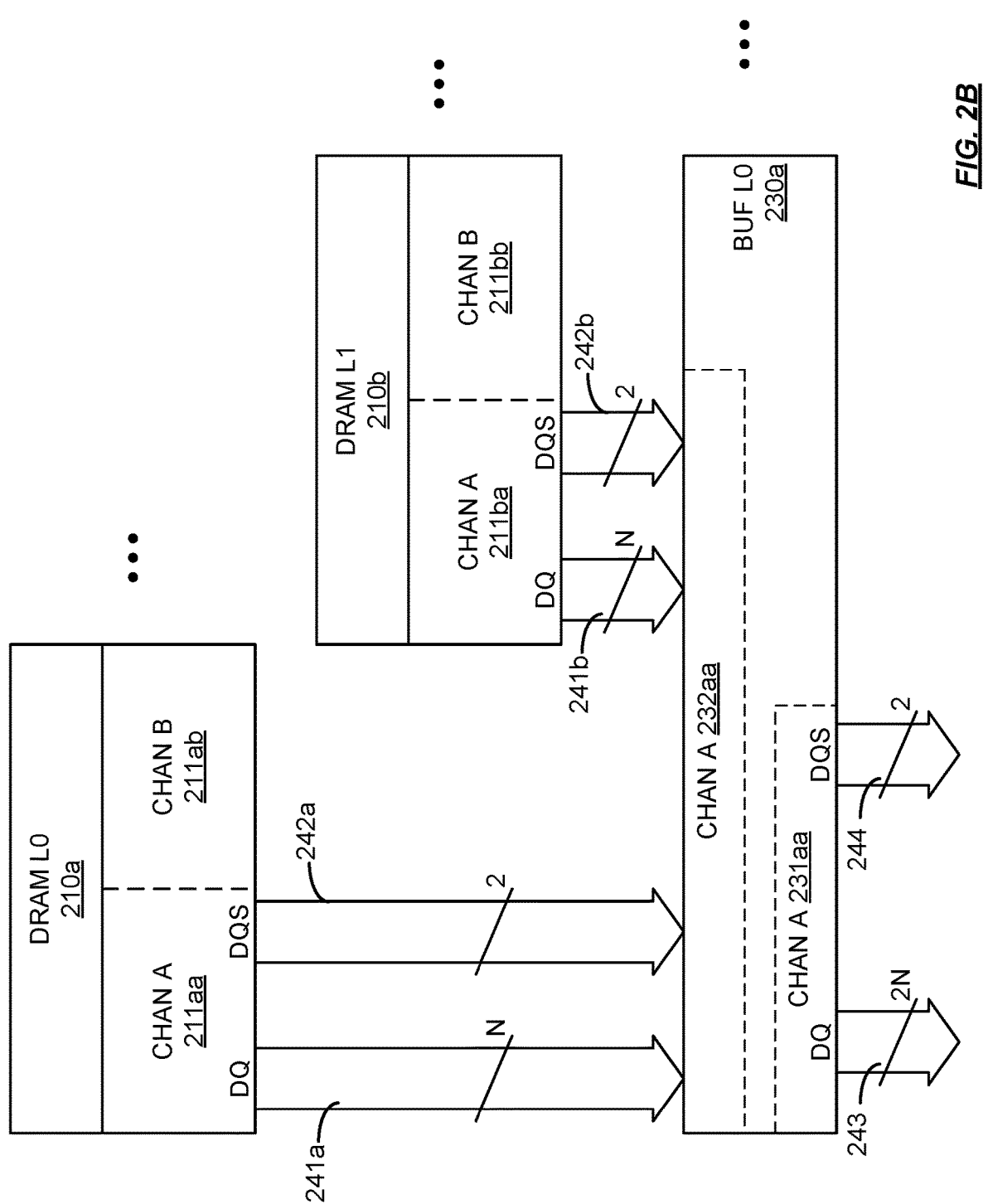
Figure 2C:
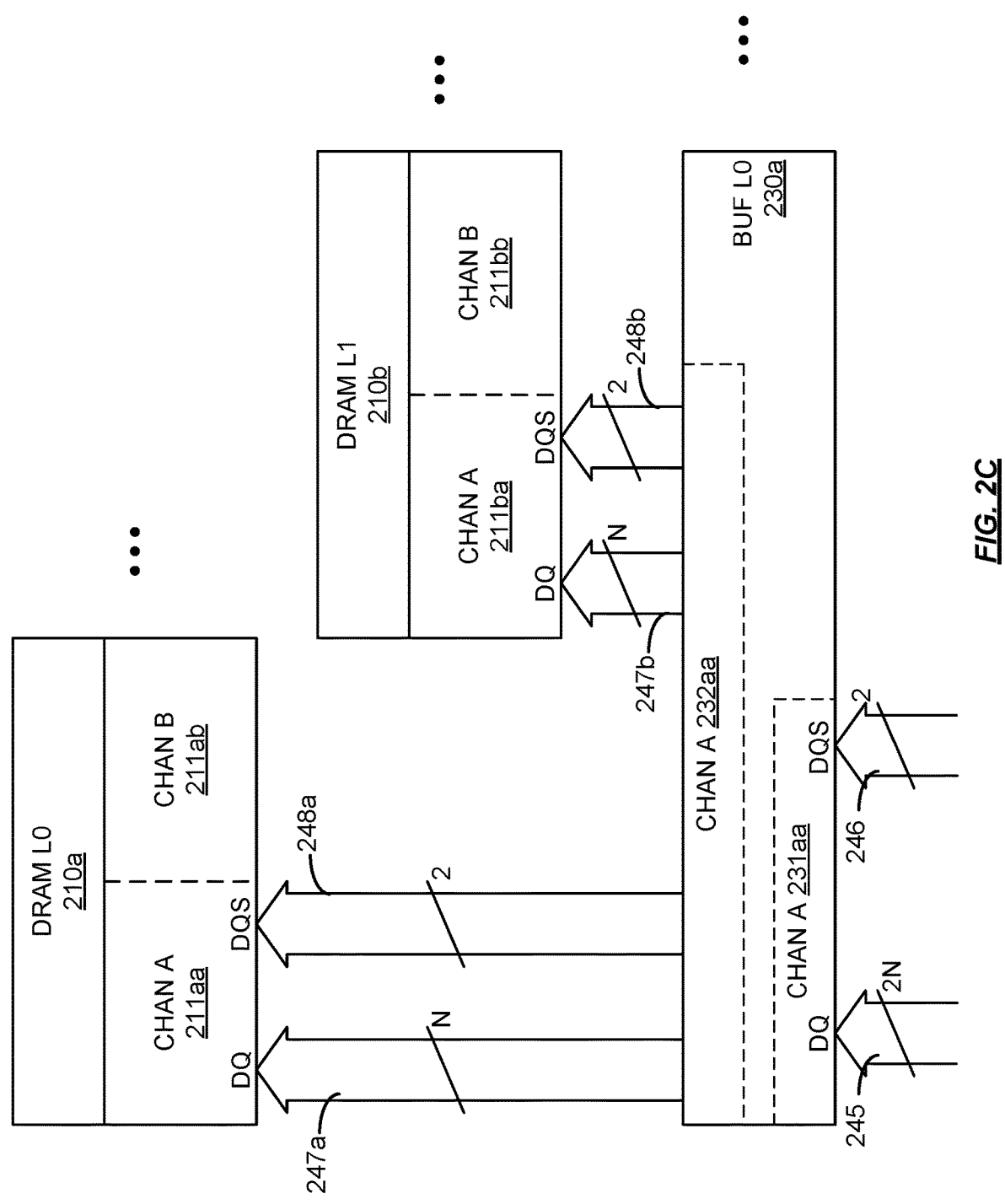

FIGS. 2A-2C illustrate a buffered memory module. In FIG. 2A, module 200 comprises left side dual channel DRAM devices 210a-210f (representing ten DRAM devices L0-L9), right side dual channel DRAM devices 210g-210l (representing ten DRAM devices R0-R9), left side dual channel buffer devices 230a-230c (representing five buffer devices BL0-BL4), right side dual channel buffer devices 230d-230f (representing five buffer devices BR0-BR4), registering clock driver (RCD) 235, channel A interface 245a, channel B interface 245b, channel C interface 245c, and channel D interface 245d. RCD 235 receives certain signals (e.g., clock, chip select) that are common to the channel A-D interfaces 245a-245d.

Each dual channel DRAM device 210a-210l includes two non-overlapping set of memory arrays that are respectively accessed via two channel interfaces 211aa-2111b that operate independently of each other. In other words, each DRAM device 210a-210l device operates the command, address, and data transfer functions of their respective channel interfaces 211aa-2111b independently of the other channel interfaces 211aa-211lb on the same DRAM device 210a-210l. Thus, for example, channel A interface 211aa of DRAM L0 210a accesses a first set of memory arrays in DRAM L0 210a and channel B interface 211ab of DRAM L0 210a accesses a second set of memory arrays in DRAM L0 210a, where the first set of memory arrays and the second set of memory array do not have any common memory array (i.e., are non-overlapping sets).

At least the CA signals of channel A interface 245a are operatively coupled to RCD 235. RCD 235 operatively couples the CA signals of channel A interface 245*a* to the channel A interfaces 211*aa*-211*fa* of the left side DRAM devices 210*a*-210*f.* Similarly, at least the CA signals of channel B interface 245*b* are operatively coupled to RCD 235. RCD 235 operatively couples the CA signals of channel B interface 245*b* to the channel B interfaces 211*ab*-211*fb* of the left side DRAM devices 210*a*-210*f.*

At least the CA signals of channel C interface 245*c* are operatively coupled to RCD 235. RCD 235 operatively couples the CA signals of channel C interface 245*c* to the channel A interfaces 211*ga*-211*la* of the right side DRAM devices 210*g*-210*l.* Similarly, at least the CA signals of channel D interface 245*d* are operatively coupled to RCD 235. RCD 235 operatively couples the CA signals of channel D interface 245*d* to the channel B interfaces 211*gb*-2111*b* of the right side DRAM devices 210*g*-210*l.*

The channel A interface 211*aa* of DRAM device 210*a* is operatively coupled to communicate N bits of data with the device side channel A interface 232*aa* of data buffer device 230*a*. In an embodiment, N=2. The channel B interface 211*ab* of DRAM device 210*a* is operatively coupled to communicate N bits of data with the device side channel B interface 232*ab* of data buffer device 230*a*. The channel A interface 211*ba* of DRAM device 210*b* is operatively coupled to communicate N bits of data with the device side channel A interface 232*aa* of data buffer device 230*a*; the channel B interface 211*bb* of DRAM device 210*b* is operatively coupled to communicate N bits of data with the device side channel B interface 232*ab* of data buffer device 230*a*; the channel A interface 211*ca* of DRAM device 210*c* is operatively coupled to communicate N bits of data with the device side channel A interface 232*ba* of data buffer device 230*b*; the channel B interface 211*cb* of DRAM device 210*c* is operatively coupled to communicate N bits of data with the device side channel B interface 232*bb* of data buffer device 230*a*, and so on with a like pattern of connection for all of the DRAM devices 210*a*-210*l* and data buffer devices 230*a*-230*f* on module 200 (which, for the sake of brevity will not be detailed herein).

Controller side channel A interface 231*aa* is operatively coupled to channel A interface 245*a*. Controller side channel A interface 231*aa* communicates 2*N bits with channel A interface 245*a*. The 2*N bits comprise N bits communicated with DRAM device 210*a* and N bits communicated with DRAM device 210*b* for a total of 2*N number of bits. Similarly, controller side channel B interface 231*ab* is operatively coupled to channel B interface 245*b*. Likewise, the controller side channel A interfaces 231*ba*-231*ca* of data buffer devices 230*b*-230*c* are operatively coupled to channel A interface 245*a*; the controller side channel B interfaces 231*bb*-231*cb* of data buffer devices 230*b*-230*c* are operatively coupled to channel B interface 245*b*; the controller side channel C interfaces 231*da*-231*fa* of data buffer devices 230*d*-230*f* are operatively coupled to channel C interface 245*c*; and, the controller side channel D interfaces 231*db*-231*fb* of data buffer devices 230*d*-230*f* are operatively coupled to channel D interface 245*d*.

FIG. 2B illustrates a read operation on channel A of module 200 using DRAM devices 210*a*-210*b* and data buffer device 230*a* as a representative example. In FIG. 2B, channel A interface 211*aa* of DRAM device 210*a* provides N bits of data signals 241*a* and a differential data strobe (DQS) signal 242*a* to device side channel A interface 232*aa* of data buffer device 230*a*. Channel A interface 211*ba* of DRAM device 210*b* provides N bits of data signals 241*b* and a differential data strobe (DQS) signal 242*b* to device side channel A interface 232*aa* of data buffer device 230*a*. In response, data buffer device 230*a* realigns (re-times) one or more of data signals 241*a*-241*b* to be output by controller side channel A interface 231*aa* as 2N number of data signals 243 in relation to a data strobe signal 244 also output by controller side channel A interface 231*aa*. It should be understood that since the timing of data signals 243 is in relation to the timing of data strobe signal 244, data buffer device 230*a* may equivalently be seen as realigning (re-timing) one or more of data strobe signals 242*a*-242*b* in relation to received data signals 241*a*-241*b* before being output by controller side channel A interface 231*aa* as 2N number of data signals 243 in relation to a data strobe signal 244. It should also be understood that re-timing the data signals 243 being output by data buffer device 230*a* in relation to a single differential data strobe signal 244 rather than two differential data strobe signals 242*a*-242*b* reduces the number of data strobes being sent by controller side channel interfaces 231*aa*-231*fb* of data buffer devices 230*a*-230*f* to a controller.

FIG. 2C illustrates a write operation on channel A of module 200 using DRAM devices 210*a*-210*b* and data buffer device 230*a* as a representative example. In FIG. 2C, controller side channel A interface 231*aa* of data buffer device 230*a* receives 2N bits of data signals 245 and a differential data strobe (DQS) signal 246 from a controller. In response, data buffer device 230*a* realigns (re-times) data signals 247*a* in relation to a data strobe signal 248*a* output by device side channel A interface 232*aa*. Similarly, data buffer device 230*a* realigns (re-times) data signals 247*b* in relation to a data strobe signal 248*b* output by device side channel A interface 232*aa*. Channel A interface 232*aa* of data buffer device 230*a* provides N bits of data signals 247*a* and a differential data strobe (DQS) signal 248*a* to channel A interface 211*aa* of DRAM device 210*a*. Channel A interface 232*aa* of data buffer device 230*a* provides N bits of data signals 247*b* and a differential data strobe (DQS) signal 248*b* to channel A interface 211*ba* of DRAM device 210*b*. It should be understood that since the timing of data signals 247*a*-247*b* is in relation to the timing of data strobe signals 248*a*-248*b*, data buffer device 230*a* may equivalently be seen as realigning (re-timing) data strobe signal 246 in relation to received data signals 245 before being output by device side channel A interface 232*aa* as two sets of N number of data signals 247*a*-247*b* in relation to respective data strobe signals 248*a*-248*b*. It should also be understood that re-timing the data signals 247*a*-247*b* being output by data buffer device 230*a* in relation to two data strobe signals 248*a*-248*b* reduces the number of data strobes being sent by the controller to data buffer devices 230*a*-230*f.*

Figure 3:
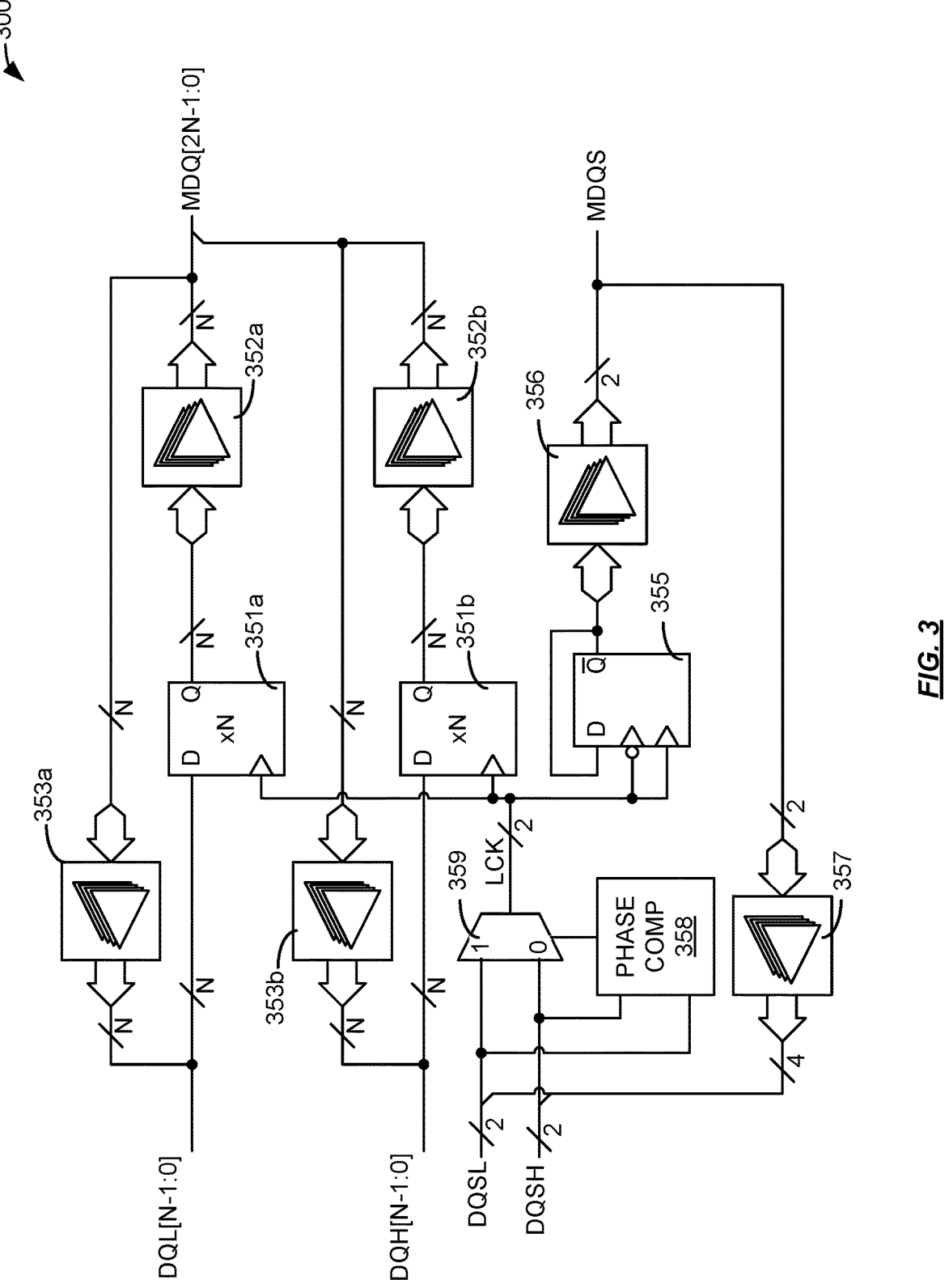
FIG. 3 illustrates example data buffer circuitry.

FIG. 3 illustrates example data buffer circuitry. The circuitry illustrated in FIG. 3 may be included in and/or used by data buffer devices 230*a*-230*f.* All or part of the circuitry illustrated in FIG. 3 may be, or be part of, for example, device side interfaces 232*aa*-232*fb* and/or controller side channel interfaces 231*aa*-231*fb*. Data buffer circuitry 300 comprises N number of device side least significant bits (LSB) latches 351*a*, N number of device side most significant bits (MSB) latches 351*b*, N number of controller side LSB buffers 352*a*, N number of controller side MSB buffers 352*b*, N number of device side LSB buffers 353*a*, N number of device side MSB buffers 353*b*, toggle latch 355, controller side read data strobe buffers 356, device side write data strobe buffers 357, phase comparator 358, and 2:1 multiplexor (MUX) 359.

For read operations, LSB latches 351*a* receive N number of LSB bits DQL[N−1:0] from a first DRAM device and latch the values upon the transition of LCK. Likewise, for read operations, MSB latches 351*b* receive N number of MSB bits DQH[N–1:0] from a second DRAM device and latch the values upon the transition of LCK. The outputs of LSB latches 351*a* and MSB latches 351*b* are respectively buffered by controller side LSB buffers 352*a* and controller side MSB buffers 352*b*. The outputs of controller side LSB buffers 352*a* and controller side MSB buffers 352*b* are provided to the controller (e.g., by controller side channel interface 231 *aa*-231*fb*) as read data signals.

Phase comparator 358 receives a data strobe DQSL from the first DRAM device and a data strobe DQSH from the second DRAM device. Phase comparator 358 detects which of DQSL and DQSH arrives later and controls MUX 359 to select the later arriving data strobe signal to be output by MUX 359 as LCK. LCK is also provided to the clock inputs of toggle latch 355. Note that toggle latch 355 is activated by both rising and falling edge of LCK. Accordingly, in FIG. 3, the symbol for toggle latch 355 has two clock inputs one denoting active high and one denoted as active low. When LCK causes latches 351*a*-351*b* to latch DQL[N–1:0] and DQH[N–1:0], toggle latch 355 generates a transition in response. The transition by toggle latch 355 is buffered by read data strobe buffers 356. The output of read data strobe buffers 356 is provided to the controller (e.g., by controller side channel interface 231*aa*-231*fb*) as a read data strobe signal MDQS. It should be understood that latching DQL [N–1:0] and DQH[N–1:0] with their respective data strobe signals DQSL and DQSH, and selecting the later arriving strobe signal among DQSL or DQSH as the basis for the read data strobe signal MDQS provided to the controller retimes (realigns) the read data strobe signal(s) received by data buffer circuitry 300 relative to the controller side read data signals MDQ[2N–1:0] provided to the controller.

For write operations, device side LSB buffers 353*a* receive N number of LSB data signals MDQ[N–1:0] from the controller and provide those bits to the first DRAM device as write data signals DQL[N–1:0]. Similarly, device side MSB buffers 353*b* receive N number of MSB data signals MDQ[2N–1:N] from the controller and provide those bits to the second DRAM device as write data signals DQH[N–1:0]. A write data strobe signal MDQS received from the controller is provided to write data strobe buffers 357. Write data strobe buffers 357 output two device side write data strobe signals DQSL and DQSH that are provided to the first DRAM device and the second DRAM device, respectively. It should be understood that write data strobe buffers 357 may be trained or otherwise configured to provide DQSL and DQSH to the first DRAM device and the second DRAM device with different timing. In other words, write data strobe buffers 357 may individually re-time MDQS when producing DQSL and DQSH in order to account for different signal delays and/or timing requirements of the first DRAM device and the second DRAM device.

Figure 4:
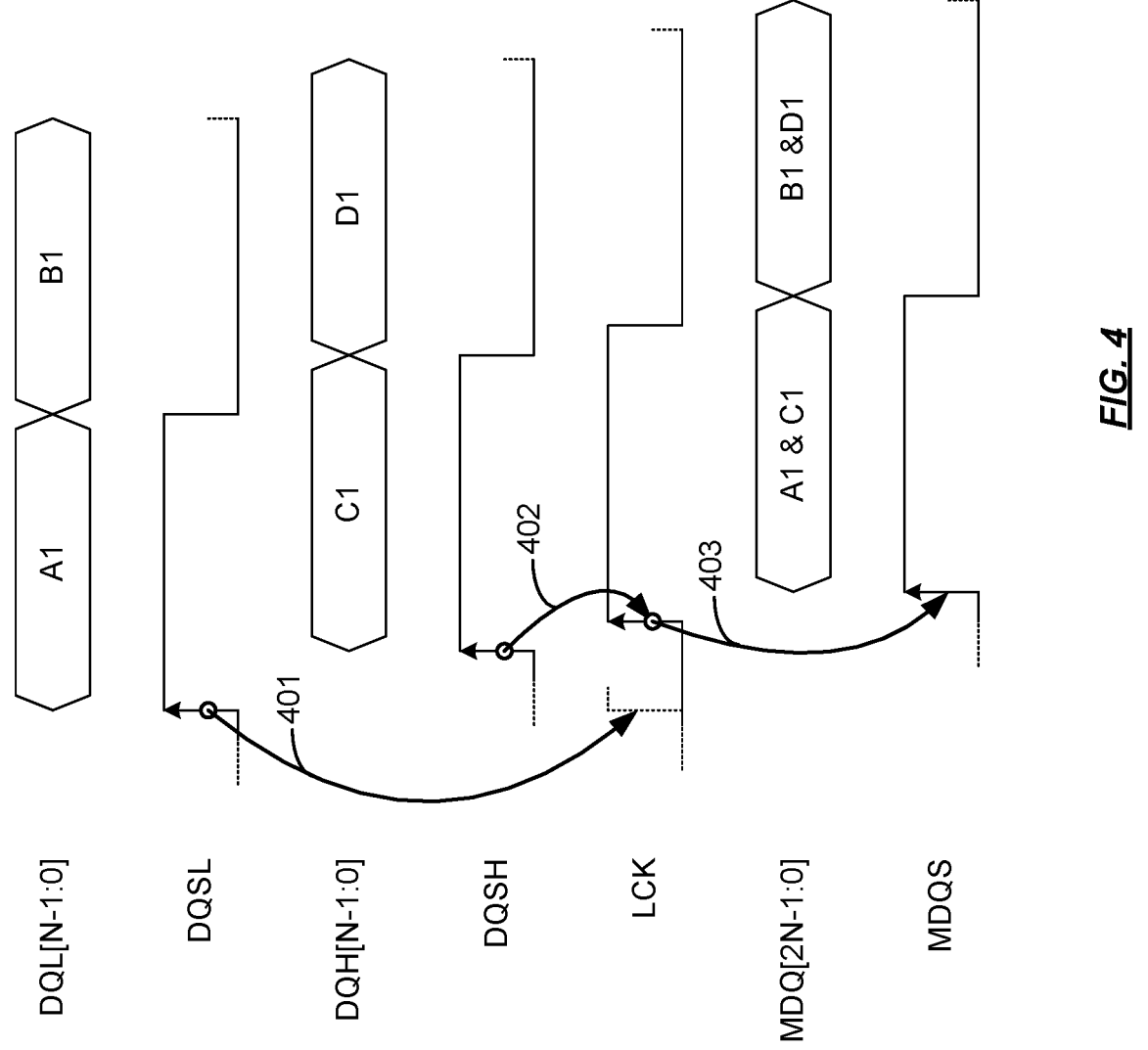
FIG. 4 is a timing diagram illustrating a read operation.

FIG. 4 is a timing diagram illustrating a read operation. The relative timings illustrated in FIG. 4 may be produced by, for example, data buffer circuitry 300. In FIG. 4, transitions on LSB data signals DQL[N–1:0] arrive coincident with transitions on LSB data strobe signal DQSL. After a rising edge on DQSL arrives, transitions on MSB data signals DQH[N–1:0] arrive coincident with a rising edge transition on MSB data strobe signal DQSH. Because the transition on DQSH arrived later than the corresponding transition on DQSL, DQSH is selected as the basis for LCK and therefore the controller read data strobe signal MDQS. This is illustrated in FIG. 4 by arrow 401 running from the rising edge transition on DQSL to a non-existent transition on LCK, arrow 402 running from the rising edge transition on DQSH to the rising edge transition on LCK, and arrow 403 running from the rising edge transition of LCK to the rising edge transition of MDQS.

Figure 5:
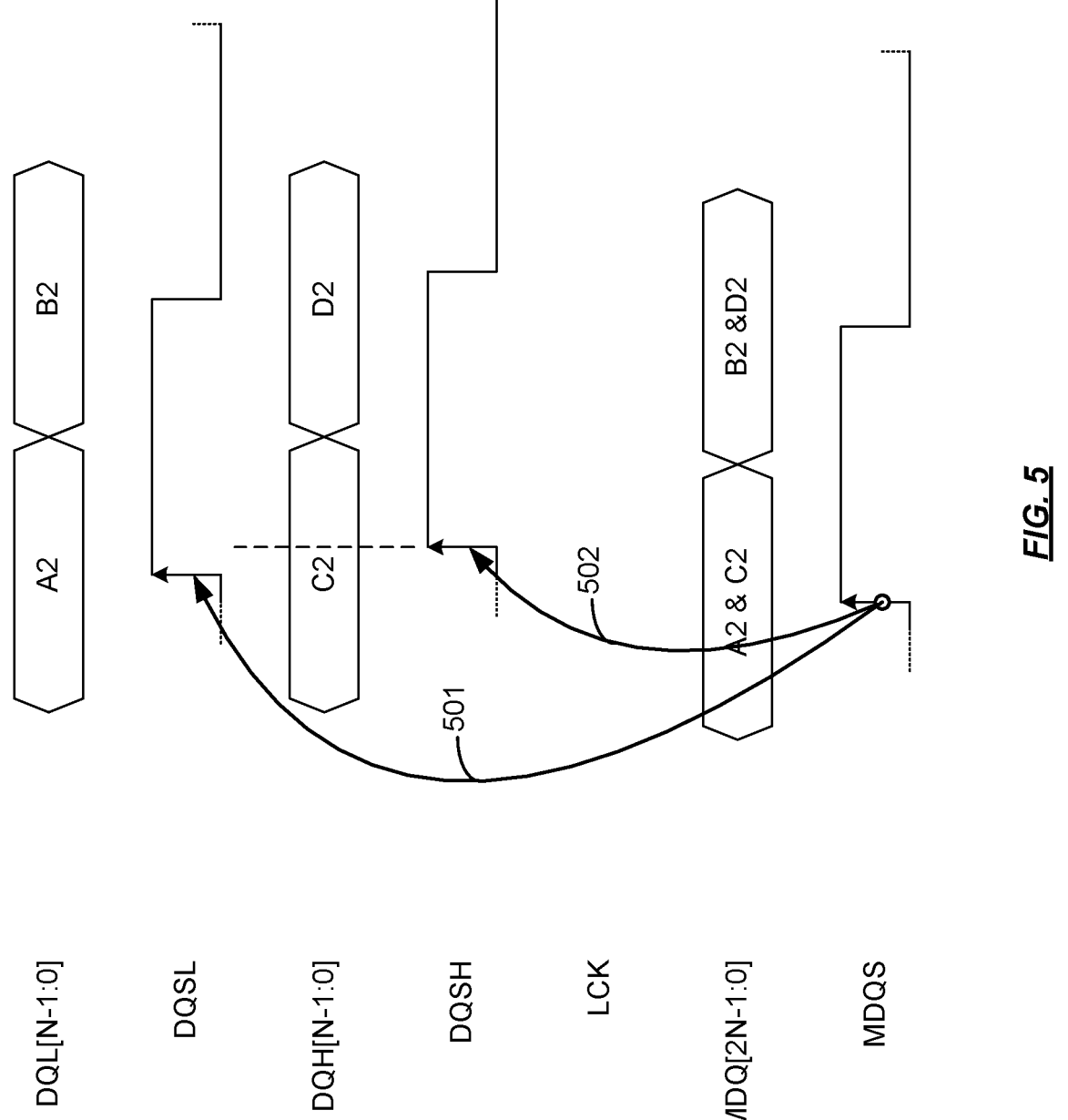
FIG. 5 is a timing diagram illustrating a write operation

FIG. 5 is a timing diagram illustrating a write operation. The relative timings illustrated in FIG. 5 may be produced by, for example, data buffer circuitry 300. In FIG. 5, transitions on controller side write data signals MDQ[2N–1:0] arrive to be latched by transitions on controller side write data strobe signal MDQS. Based on write data strobe signal MDQS, LSB and MSB write data strobes DQSL and DQSH are produced with different timings (e.g., by write data strobe buffers 357). This is illustrated in FIG. 5 by arrow 501 running from the rising edge of MDQS to the rising edge of DQSL and arrow 502 running from the rising edge of MDQS to the rising edge of DQSH where the rising edges of DQSL and DQSH are not aligned in time. In an embodiment, the timing difference between rising edges of DQSH and DQSL can be programmed to compensate the nonidentical DQS tree timing drift in each device.

Figure 6:
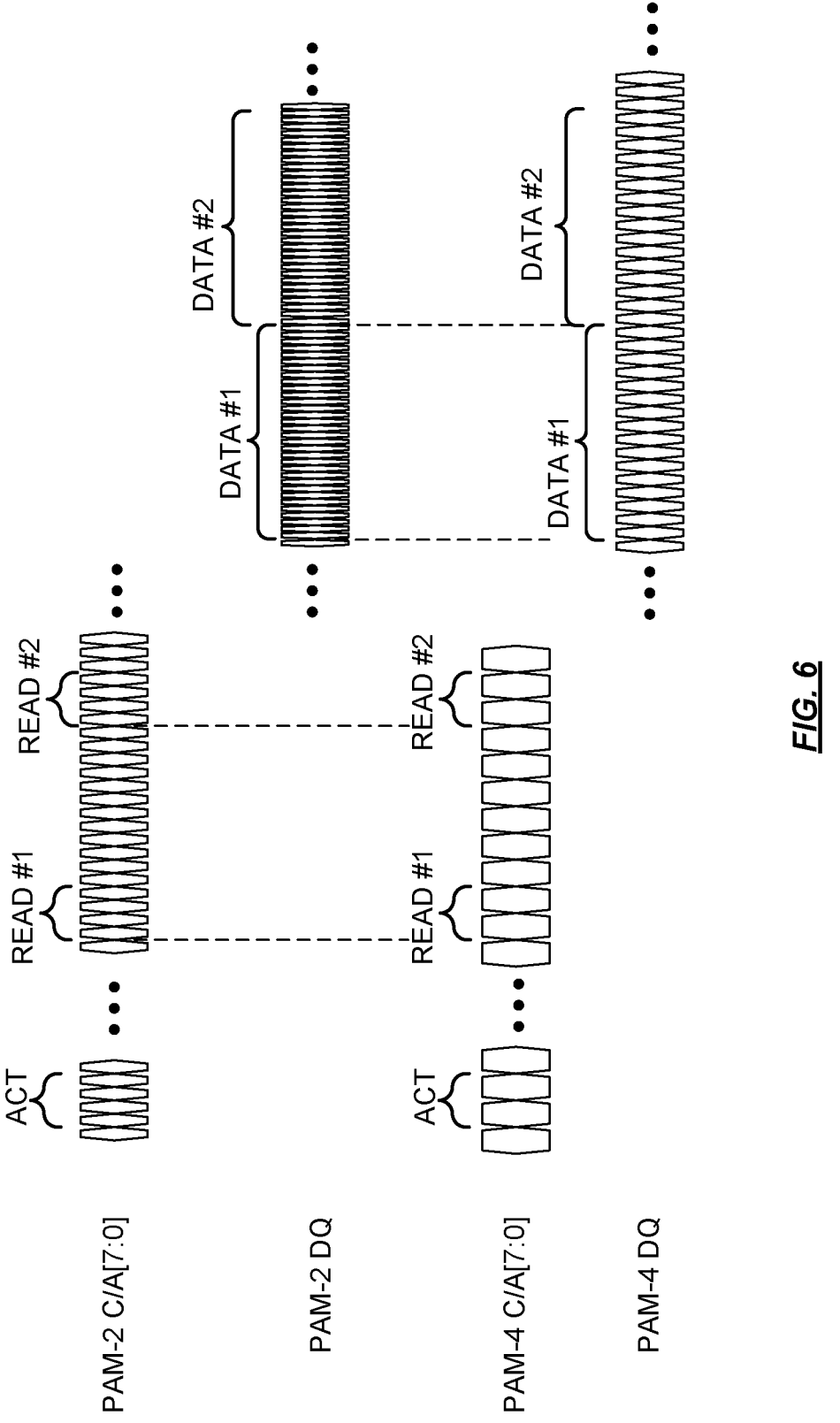
FIG. 6 is a timing diagram illustrating read operations communicated using two level and four level pulse amplitude modulation.

FIG. 6 is a timing diagram illustrating read operations communicated using two level and four level pulse amplitude modulation. In FIG. 6, the two level pulse amplitude modulation (PAM-2) and the four level pulse amplitude modulation (PAM-4) have the same packet timings, packet lengths (in time), and same access delays. To accomplish this, as is illustrated by FIG. 6, the PAM-2 command/address and data symbols are communicated at a rate that is twice the symbol rate of the PAM-4 symbol rate. Other timings (e.g., ACT to read, etc.) may be the same regardless of whether PAM-2 or PAM-4 signaling is used.

FIG. 7 is a flowchart illustrating a method of accessing a dual channel memory device. One or more of the steps illustrated in FIG. 7 may be performed by, for example, memory system 100, module 200, data buffer circuitry 300, and/or their components. By a controller, a first command is transmitted to a first memory access channel of a DRAM device (702). For example, controller 120 may transmit, via channel A interface 121*a* and channel A interfaces 111*aa*-111*ba*, a first memory access command.

Independent of the first command, a second command is transmitted to a second memory access channel of the DRAM device (704). For example, without regard to the existence and/or timing of the first command, controller 120 may transmit, via channel B interface 121*b* and channel B interfaces 111*ab*-111*bb*, a second memory access command.

FIG. 8 is a flowchart illustrating a method of providing a data strobe to a controller. One or more of the steps illustrated in FIG. 8 may be performed by, for example, memory system 100, module 200, data buffer circuitry 300, and/or their components. By a first DRAM device and to a data buffer device, first data and a first data strobe are transmitted (802). For example, data signals 241*a* and data strobe signal 242*a* may be transmitted by DRAM device 210*a* to data buffer device 230*a* via channel A interface 211*aa* and device side channel A interface 232*aa*.

By a second DRAM device and to the data buffer device, second data and a second data strobe are transmitted (804). For example, data signals 241*b* and data strobe signal 242*b* may be transmitted by DRAM device 210*b* to data buffer device 230*a* via channel A interface 211*ba* and device side channel A interface 232*aa*. By the data buffer device and to a controller, the first data, the second data, and a third timing strobe that is based on the second timing strobe is transmitted (806). For example, data signals 243 and data strobe signal 244 may be transmitted by data buffer device 230*a* to a controller. Data strobe signal 244 may be based on data strobe signal 242b because data strobe signal 242b arrived later than data strobe signal 242a.

FIG. 9 is a flowchart illustrating a method of providing data strobes to memory devices. One or more of the steps illustrated in FIG. 9 may be performed by, for example, memory system 100, module 200, data buffer circuitry 300, and/or their components. By a data buffer and from a controller, first data, second data, and a first timing strobe are received (902). For example, data signals 245, comprising data to be relayed as data signals 247a and data signals 247b, and data strobe signal 246 may be received by data buffer device 230a from a controller.

By the data buffer device and to a first DRAM device, the first data, and a second timing strobe that is based on the first timing strobe, is transmitted. For example, data signals 247a and data strobe signal 248a may be transmitted by data buffer device 230a to DRAM device 210a where data strobe signal 248a is based on data strobe signal 246. By the data buffer device and to a second DRAM device, the second data, and a third timing strobe that is based on the first timing strobe, is transmitted. For example, data signals 247b and data strobe signal 248b may be transmitted by data buffer device 230a to DRAM device 210b where data strobe signal 248b is based on data strobe signal 246.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of memory system 100, module 200, data buffer circuitry 300, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 10:
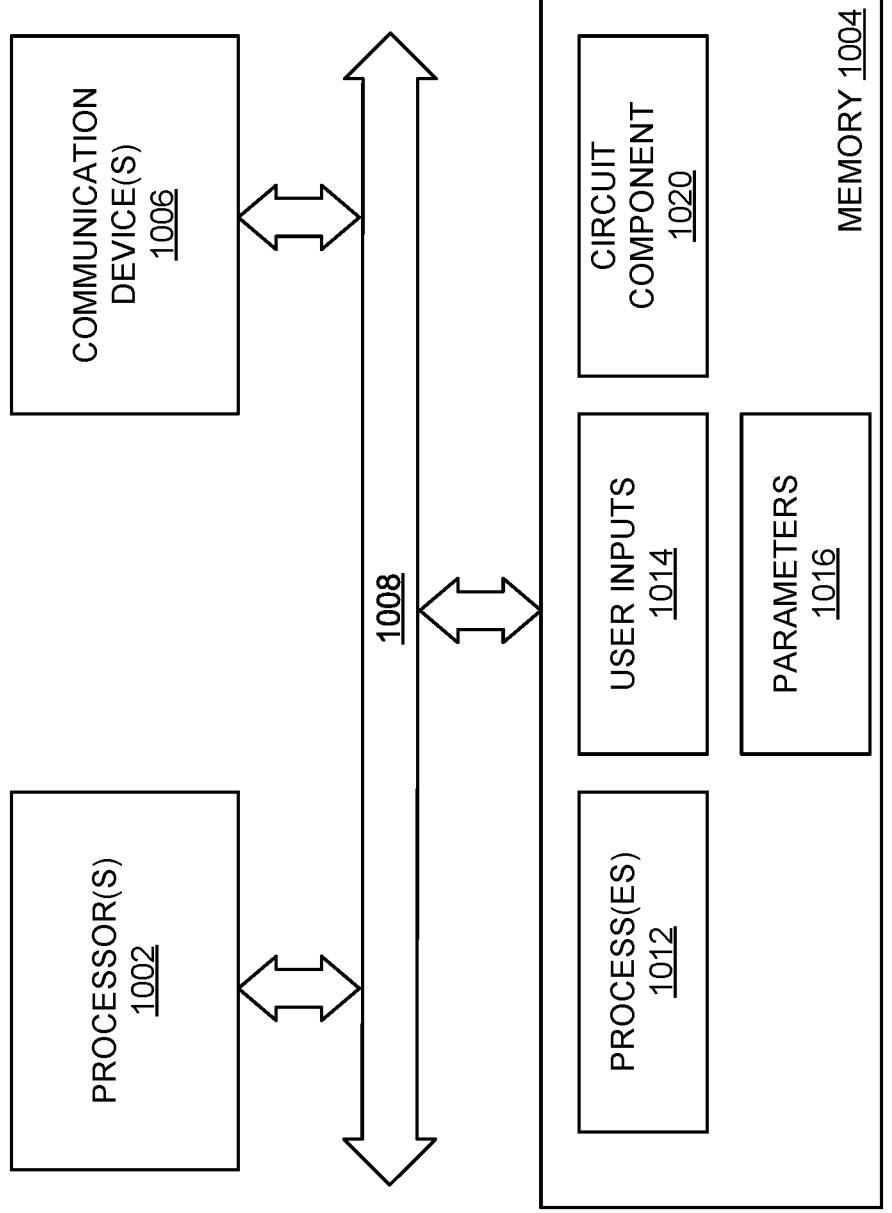
FIG. 10 is a block diagram of a processing system.

FIG. 10 is a block diagram illustrating one embodiment of a processing system 1000 for including, processing, or generating, a representation of a circuit component 1020. Processing system 1000 includes one or more processors 1002, a memory 1004, and one or more communications devices 1006. Processors 1002, memory 1004, and communications devices 1006 communicate using any suitable type, number, and/or configuration of wired and/or wireless connections 1008.

Processors 1002 execute instructions of one or more processes 1012 stored in a memory 1004 to process and/or generate circuit component 1020 responsive to user inputs 1014 and parameters 1016. Processes 1012 may be any suitable electronic design automation (EDA) tool or portion thereof used to design, simulate, analyze, and/or verify electronic circuitry and/or generate photomasks for electronic circuitry. Representation 1020 includes data that describes all or portions of memory system 100, module 200, data buffer circuitry 300, and their components, as shown in the Figures.

Representation 1020 may include one or more of behavioral, register transfer, logic component, transistor, and layout geometry-level descriptions. Moreover, representation 1020 may be stored on storage media or communicated by carrier waves.

Data formats in which representation 1020 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email.

User inputs 1014 may comprise input parameters from a keyboard, mouse, voice recognition interface, microphone and speakers, graphical display, touch screen, or other type of user interface device. This user interface may be distributed among multiple interface devices. Parameters 1016 may include specifications and/or characteristics that are input to help define representation 1020. For example, parameters 1016 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 1004 includes any suitable type, number, and/or configuration of non-transitory computer-readable storage media that stores processes 1012, user inputs 1014, parameters 1016, and circuit component 1020.

Communications devices 1006 include any suitable type, number, and/or configuration of wired and/or wireless devices that transmit information from processing system 1000 to another processing or storage system (not shown) and/or receive information from another processing or storage system (not shown). For example, communications devices 1006 may transmit circuit component 1020 to another system. Communications devices 1006 may receive processes 1012, user inputs 1014, parameters 1016, and/or circuit component 1020 and cause processes 1012, user inputs 1014, parameters 1016, and/or circuit component 1020 to be stored in memory 1004.

Implementations discussed herein include, but are not limited to, the following examples:

Example 1: A memory module, comprising: a first plurality of dynamic random access memory (DRAM) devices each having a respective first memory access interface and a second respective memory access interface to operate independently of each other to access one of two respective sets of memory cores in respective ones of the first plurality of DRAM devices where respective sets of memory cores in the respective ones of the first plurality of DRAM devices are non-overlapping sets; a first memory access channel interface to communicate data with each of the respective first memory access interfaces; a second memory access channel interface to communicate data with each of the respective second memory access interfaces; and a first plurality of data buffer devices each having a first host side interface, a first device side interface, a second host side interface, and a second device side interface, respective first host side interfaces and respective second host side interfaces each to operate independently of each other, respective first device side interfaces and respective second device side interfaces to each include more data strobe signals than respective first host side interfaces and respective second host side interface, each of the respective first device side interfaces and each of the respective second device side interfaces to communicate with at least two of the first plurality of DRAM devices.

Example 2: The memory module of example 1, further comprising: a second plurality of dynamic random access memory (DRAM) devices each having a respective third memory access interface and a fourth respective memory access interface to operate independently of each other to access one of two respective sets of memory cores in respective ones of the second plurality of DRAM devices where the respective sets of memory cores in the respective ones of the second plurality of DRAM devices are non-overlapping sets; a third memory access channel interface to communicate data with the respective third memory access interfaces; a fourth memory access channel interface to communicate data with the respective fourth memory access interfaces; and, a second plurality of data buffer devices each having a third host side interface, a third device side interface, a fourth host side interface, and a fourth device side interface, respective third host side interfaces and respective fourth host side interfaces each to operate independently of each other, respective third device side interfaces and respective fourth device side interfaces to each include more data strobe signals than respective third host side interfaces and respective fourth host side interfaces, each of the respective third device side interfaces and each of the respective fourth device side interfaces to communicate with at least two of the second plurality of DRAM devices.

Example 3: The memory module of example 1, wherein the first plurality of data buffer devices include first circuitry to determine a first timing between a first data strobe transmitted via the first device side interface and at least a first data signal transmitted via the first device side interface and second circuitry to, independent of the first timing, determine a second timing between a second data strobe transmitted via the second device side interface and at least a second data signal transmitted via the second device side interface.

Example 4: The memory module of example 1, wherein the first plurality of data buffer devices include first circuitry to determine a first timing between a first data strobe transmitted via the first device side interface to a first one of the at least two of the first plurality of DRAM devices and at least a first data signal transmitted via the first device side interface to the first one of the at least two of the first plurality of DRAM devices and second circuitry to, independent of the first timing, determine a second timing between a second data strobe transmitted via the second device side interface to a second one of the at least two of the first plurality of DRAM devices and at least a second data signal transmitted via the second device side interface to the second one of the at least two of the first plurality of DRAM devices.

Example 5: The memory module of example 1, wherein the first plurality of data buffer devices include first circuitry to determine a first timing between a first data strobe received via the first device side interface and a first sampling of at least a first data signal transmitted to the first device side interface and second circuitry to, independent of the first timing, determine a second timing between a second data strobe received via the second device side interface and a second sampling of at least a second data signal transmitted to the second device side interface.

Example 6: The memory module of example 1, wherein the first plurality of data buffer devices include first circuitry to determine a first timing between a first data strobe received via the first device side interface from a first one of the at least two of the first plurality of DRAM devices and a first sampling of at least a first data signal transmitted to the first device side interface from the first one of the at least two of the first plurality of DRAM devices and second circuitry to, independent of the first timing, determine a second timing between a second data strobe received via the second device side interface from a second one of the at least two of the first plurality of DRAM devices and a sampling of at least a second data signal transmitted to the second device side interface from the second one of the at least two of the first plurality of DRAM devices.

Example 7: A memory module, comprising: a first plurality of dual independent channel dynamic random access memory (DRAM) devices; and, a first plurality of dual independent channel data buffer devices each to communicate data with the first plurality of dual independent channel DRAM devices, each of the first plurality of dual independent channel data buffer devices to communicate data with a unique two of the first plurality of dual independent channel DRAM devices, each of the first plurality of dual independent channel data buffer devices to communicate the data with the unique two of the first plurality of dual independent channel DRAM devices using both dual independent channels of the unique two of the first plurality of dual independent channel DRAM devices and corresponding both dual independent channels of the first plurality of dual independent channel data buffer devices.

Example 8: The memory module of example 7, further comprising: a second plurality of dual independent channel DRAM devices; and, a second plurality of dual independent channel data buffer devices each to communicate data with the second plurality of dual independent channel DRAM devices, each of the second plurality of dual independent channel data buffer devices to communicate data with a unique two of the second plurality of dual independent channel DRAM devices, each of the second plurality of dual independent channel data buffer devices to communicate the data with the unique two of the second plurality of dual independent channel DRAM devices using both dual independent channels of the unique two of the second plurality of dual independent channel DRAM devices and corresponding both dual independent channels of the second plurality of dual independent channel data buffer devices, the first plurality of dual independent channel DRAM devices to be operated independently of the second plurality of dual independent channel DRAM devices.

Example 9: The memory module of example 8, wherein the first plurality of dual independent channel data buffer devices communicate a first data strobe with a first access interface of a first one of the unique two of the first plurality of dual independent channel DRAM devices, a second data strobe with the first access interface of a second one of the unique two of the first plurality of dual independent channel DRAM devices, a third data strobe with a second access interface of the first one of the unique two of the first plurality of dual independent channel DRAM devices, and a fourth data strobe with the second access interface of the second one of the unique two of the first plurality of dual independent channel DRAM devices.

Example 10: The memory module of example 9, wherein timings between data communicated between the unique two of the first plurality of dual independent channel DRAM devices and a corresponding one of the first plurality of dual independent channel data buffer devices and the first data strobe, the second data strobe, the third data strobe, and the fourth data strobe of the corresponding one of the first plurality of dual independent channel data buffer devices are to be independently set.

Example 11: The memory module of example 9, further comprising: a registering clock driver device having a first command interface to transmit commands to respective first independent channels of the first plurality of dual independent channel DRAM devices, a second command interface to transmit commands to respective second independent channels of the first plurality of dual independent channel DRAM devices, a third command interface to transmit commands to respective first independent channels of the second plurality of dual independent channel DRAM devices, and a fourth command interface to transmit commands to respective second independent channels of the second plurality of dual independent channel DRAM devices.

Example 12: The memory module of example 11, wherein the registering clock driver device further comprises: a first host command interface to receive commands to transmit to respective first independent channels of the first plurality of dual independent channel DRAM devices, a second host command interface to receive commands to transmit to respective second independent channels of the first plurality of dual independent channel DRAM devices, a third host command interface to receive commands to transmit to respective first independent channels of the second plurality of dual independent channel DRAM devices, and a fourth host command interface to receive commands to transmit to respective second independent channels of the second plurality of dual independent channel DRAM devices.

Example 13: The memory module of example 12, wherein the first command interface transmits commands via a first number of signal connections, the first host command interface receives commands via a second number of signal connections, where the first number of signal connections is substantially double the second number of signal connections.

Example 14: The memory module of example 11, wherein the registering clock driver device further comprises: a first host command interface to receive commands to transmit to respective first independent channels of the first plurality of dual independent channel DRAM devices and to receive commands to transmit to respective second independent channels of the first plurality of dual independent channel DRAM devices, a second host command interface to receive commands to transmit to respective first independent channels of the second plurality of dual independent channel DRAM devices and to receive commands to transmit to respective second independent channels of the second plurality of dual independent channel DRAM devices.

Example 15: The memory module of example 14, wherein the commands to be transmitted to the respective first independent channels of the first plurality of dual independent channel DRAM devices and to be transmitted to the respective second independent channels of the first plurality of dual independent channel DRAM devices are time-multiplexed.

Example 16: A memory module, comprising: a plurality of dynamic random access memory (DRAM) devices, each of the plurality of DRAM devices comprising a first memory device access interface and a second memory device access interface that each include command, address, and data transfer function that operate independently of the command, address, and data transfer function of the other of the first memory device access interface and the second memory device access interface; a plurality of data buffer devices, each of the plurality of data buffer devices comprising a first DRAM device data interface and a second DRAM device data interface; respective ones of the first DRAM device data interfaces of the plurality of data buffer devices to communicate data with a respective unique subset of two of the plurality of DRAM devices via respective ones of the first memory device access interface of the respective unique subset of two of the plurality of DRAM devices, the data communicated with the respective unique subset of two of the plurality of DRAM devices via respective ones of the first memory device access interface of the respective unique subset of two of the plurality of DRAM devices to also be communicated via a one of a first memory channel and a second memory channel; respective ones of the second DRAM device data interfaces of the plurality of data buffer devices to communicate data with the respective unique subset of two of the plurality of DRAM devices via respective ones of the second memory device access interface of the respective unique subset of two of the plurality of DRAM devices, the data communicated with the respective unique subset of two of the plurality of DRAM devices via respective ones of the second memory device access interface of the respective unique subset of two of the plurality of DRAM devices to also be communicated via a one of a third memory channel and a fourth memory channel; and, the first memory channel, the second memory channel, the third memory channel, and the fourth memory channel each including command, address, and data transfer functions that operate independently of the command, address, and data transfer function of the other of the first memory channel, the second memory channel, the third memory channel, and the fourth memory channel.

Example 17: The memory module of example 16, wherein the first DRAM device data interface includes a first data strobe signal and a second data strobe signal.

Example 18: The memory module of example 17, wherein each respective first data strobe signal determines a first respective timing of the data communicated with a respective first one of the respective unique subset of two of the plurality of DRAM devices and each respective second data strobe signal determines a second respective timing of the data communicated with a respective second one of the respective unique subset of two of the plurality of DRAM devices.

Example 19: The memory module of example 16, wherein the first memory channel communicates data with a first subset of the plurality of DRAM devices via respective first memory device access interfaces.

Example 20: The memory module of example 18, wherein the first memory channel includes a first number of memory channel data strobe signals and respective first memory device access interfaces include a second number of memory device access interface data strobe signals, where the second number is at least twice the first number.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A memory module, comprising:
a first plurality of dynamic random access memory (DRAM) devices each having a respective first memory access interface and a second respective memory access interface to operate independently of each other to access one of two respective sets of memory cores in respective ones of the first plurality of DRAM devices where respective sets of memory cores in the respective ones of the first plurality of DRAM devices are non-overlapping sets;
a first memory access channel interface to communicate data with each of the respective first memory access interfaces;
a second memory access channel interface to communicate data with each of the respective second memory access interfaces; and
a first plurality of data buffer devices each having a first host side interface, a first device side interface, a second host side interface, and a second device side interface, respective first host side interfaces and respective second host side interfaces each to operate independently of each other, respective first device side interfaces and respective second device side interfaces to each include more data strobe signals than respective first host side interfaces and respective second host side interface, each of the respective first device side interfaces and each of the respective second device side interfaces to communicate with at least two of the first plurality of DRAM devices.

2. The memory module of claim 1, further comprising:
a second plurality of dynamic random access memory (DRAM) devices each having a respective third memory access interface and a fourth respective memory access interface to operate independently of each other to access one of two respective sets of memory cores in respective ones of the second plurality of DRAM devices where the respective sets of memory cores in the respective ones of the second plurality of DRAM devices are non-overlapping sets;
a third memory access channel interface to communicate data with the respective third memory access interfaces;

a fourth memory access channel interface to communicate data with the respective fourth memory access interfaces; and
a second plurality of data buffer devices each having a third host side interface, a third device side interface, a fourth host side interface, and a fourth device side interface, respective third host side interfaces and respective fourth host side interfaces each to operate independently of each other, respective third device side interfaces and respective fourth device side interfaces to each include more data strobe signals than respective third host side interfaces and respective fourth host side interfaces, each of the respective third device side interfaces and each of the respective fourth device side interfaces to communicate with at least two of the second plurality of DRAM devices.

3. The memory module of claim 1, wherein the first plurality of data buffer devices include first circuitry to determine a first timing between a first data strobe transmitted via the first device side interface and at least a first data signal transmitted via the first device side interface and second circuitry to, independent of the first timing, determine a second timing between a second data strobe transmitted via the second device side interface and at least a second data signal transmitted via the second device side interface.

4. The memory module of claim 1, wherein the first plurality of data buffer devices include first circuitry to determine a first timing between a first data strobe transmitted via the first device side interface to a first one of the at least two of the first plurality of DRAM devices and at least a first data signal transmitted via the first device side interface to the first one of the at least two of the first plurality of DRAM devices and second circuitry to, independent of the first timing, determine a second timing between a second data strobe transmitted via the second device side interface to a second one of the at least two of the first plurality of DRAM devices and at least a second data signal transmitted via the second device side interface to the second one of the at least two of the first plurality of DRAM devices.

5. The memory module of claim 1, wherein the first plurality of data buffer devices include first circuitry to determine a first timing between a first data strobe received via the first device side interface and a first sampling of at least a first data signal transmitted to the first device side interface and second circuitry to, independent of the first timing, determine a second timing between a second data strobe received via the second device side interface and a second sampling of at least a second data signal transmitted to the second device side interface.

6. The memory module of claim 1, wherein the first plurality of data buffer devices include first circuitry to determine a first timing between a first data strobe received via the first device side interface from a first one of the at least two of the first plurality of DRAM devices and a first sampling of at least a first data signal transmitted to the first device side interface from the first one of the at least two of the first plurality of DRAM devices and second circuitry to, independent of the first timing, determine a second timing between a second data strobe received via the second device side interface from a second one of the at least two of the first plurality of DRAM devices and a sampling of at least a second data signal transmitted to the second device side interface from the second one of the at least two of the first plurality of DRAM devices.

7. A memory module, comprising:

a first plurality of dual independent channel dynamic random access memory (DRAM) devices, each comprising a first memory access interface and a second memory access interface that operate independently of each other to access non-overlapping sets of memory cores; and a first plurality of dual independent channel data buffer devices each to communicate data with the first plurality of dual independent channel DRAM devices, each of the first plurality of dual independent channel data buffer devices to communicate data with a unique two of the first plurality of dual independent channel DRAM devices, wherein each of the first plurality of dual independent channel data buffer devices comprise a first host-side interface and a second host-side interface that operate independently of each other, each of the first plurality of dual independent channel data buffer devices also comprising a first device-side interface and a second device-side interface that include more data strobe signals that a respective corresponding one of the first host-side interface and a second host-side interface, each of the first plurality of dual independent channel data buffer devices to communicate the data with the unique two of the first plurality of dual independent channel DRAM devices using both dual independent channels of the unique two of the first plurality of dual independent channel DRAM devices and corresponding both dual independent channels of the first plurality of dual independent channel data buffer devices.

8. The memory module of claim 7, further comprising:

a second plurality of dual independent channel DRAM devices; and a second plurality of dual independent channel data buffer devices each to communicate data with the second plurality of dual independent channel DRAM devices, each of the second plurality of dual independent channel data buffer devices to communicate data with a unique two of the second plurality of dual independent channel DRAM devices, each of the second plurality of dual independent channel data buffer devices to communicate the data with the unique two of the second plurality of dual independent channel DRAM devices using both dual independent channels of the unique two of the second plurality of dual independent channel DRAM devices and corresponding both dual independent channels of the second plurality of dual independent channel data buffer devices, the first plurality of dual independent channel DRAM devices to be operated independently of the second plurality of dual independent channel DRAM devices.

9. The memory module of claim 8, wherein the first plurality of dual independent channel data buffer devices communicate a first data strobe with a first access interface of a first one of the unique two of the first plurality of dual independent channel DRAM devices, a second data strobe with the first access interface of a second one of the unique two of the first plurality of dual independent channel DRAM devices, a third data strobe with a second access interface of the first one of the unique two of the first plurality of dual independent channel DRAM devices, and a fourth data strobe with the second access interface of the second one of the unique two of the first plurality of dual independent channel DRAM devices.

10. The memory module of claim 9, wherein timings between data communicated between the unique two of the first plurality of dual independent channel DRAM devices and a corresponding one of the first plurality of dual independent channel data buffer devices and the first data strobe, the second data strobe, the third data strobe, and the fourth data strobe of the corresponding one of the first plurality of dual independent channel data buffer devices are to be independently set.

11. The memory module of claim 9, further comprising:

a registering clock driver device having a first command interface to transmit commands to respective first independent channels of the first plurality of dual independent channel DRAM devices, a second command interface to transmit commands to respective second independent channels of the first plurality of dual independent channel DRAM devices, a third command interface to transmit commands to respective first independent channels of the second plurality of dual independent channel DRAM devices, and a fourth command interface to transmit commands to respective second independent channels of the second plurality of dual independent channel DRAM devices.

12. The memory module of claim 11, wherein the registering clock driver device further comprises:

a first host command interface to receive commands to transmit to respective first independent channels of the first plurality of dual independent channel DRAM devices, a second host command interface to receive commands to transmit to respective second independent channels of the first plurality of dual independent channel DRAM devices, a third host command interface to receive commands to transmit to respective first independent channels of the second plurality of dual independent channel DRAM devices, and a fourth host command interface to receive commands to transmit to respective second independent channels of the second plurality of dual independent channel DRAM devices.

13. The memory module of claim 12, wherein the first command interface transmits commands via a first number of signal connections, the first host command interface receives commands via a second number of signal connections, where the first number of signal connections is substantially double the second number of signal connections.

14. The memory module of claim 11, wherein the registering clock driver device further comprises:

a first host command interface to receive commands to transmit to respective first independent channels of the first plurality of dual independent channel DRAM devices and to receive commands to transmit to respective second independent channels of the first plurality of dual independent channel DRAM devices, a second host command interface to receive commands to transmit to respective first independent channels of the second plurality of dual independent channel DRAM devices and to receive commands to transmit to respective second independent channels of the second plurality of dual independent channel DRAM devices.

15. The memory module of claim 14, wherein the commands to be transmitted to the respective first independent channels of the first plurality of dual independent channel DRAM devices and to be transmitted to the respective second independent channels of the first plurality of dual independent channel DRAM devices are time-multiplexed.

16. A memory module, comprising:

a plurality of dynamic random access memory (DRAM) devices, each of the plurality of DRAM devices comprising a first memory device access interface and a second memory device access interface that each include command, address, and data transfer function that operate independently of the command, address, and data transfer function of the other of the first memory device access interface and the second memory device access interface;

a plurality of data buffer devices, each of the plurality of data buffer devices comprising a first DRAM device data interface and a second DRAM device data interface;

respective ones of the first DRAM device data interfaces of the plurality of data buffer devices to communicate data with a respective unique subset of two of the plurality of DRAM devices via respective ones of the first memory device access interface of the respective unique subset of two of the plurality of DRAM devices, the data communicated with the respective unique subset of two of the plurality of DRAM devices via respective ones of the first memory device access interface of the respective unique subset of two of the plurality of DRAM devices to also be communicated via a one of a first memory channel and a second memory channel;

respective ones of the second DRAM device data interfaces of the plurality of data buffer devices to communicate data with the respective unique subset of two of the plurality of DRAM devices via respective ones of the second memory device access interface of the respective unique subset of two of the plurality of DRAM devices, the data communicated with the respective unique subset of two of the plurality of DRAM devices via respective ones of the second memory device access interface of the respective unique subset of two of the plurality of DRAM devices to also be communicated via a one of a third memory channel and a fourth memory channel; and the first memory channel, the second memory channel, the third memory channel, and the fourth memory channel each including command, address, and data transfer functions that operate independently of the command, address, and data transfer function of the other of the first memory channel, the second memory channel, the third memory channel, and the fourth memory channel.

17. The memory module of claim 16, wherein the first DRAM device data interface includes a first data strobe signal and a second data strobe signal.

18. The memory module of claim 17, wherein each respective first data strobe signal determines a first respective timing of the data communicated with a respective first one of the respective unique subset of two of the plurality of DRAM devices and each respective second data strobe signal determines a second respective timing of the data communicated with a respective second one of the respective unique subset of two of the plurality of DRAM devices.

19. The memory module of claim 16, wherein the first memory channel communicates data with a first subset of the plurality of DRAM devices via respective first memory device access interfaces.

20. The memory module of claim 18, wherein the first memory channel includes a first number of memory channel data strobe signals and respective first memory device access interfaces include a second number of memory device access interface data strobe signals, where the second number is at least twice the first number.

* * * * *